US012656144B2

(12) United States Patent
Desai et al.

(10) Patent No.: US 12,656,144 B2
(45) Date of Patent: Jun. 16, 2026

(54) METHOD AND SYSTEM FOR IDENTIFICATION OF CHARGING STATION LOCATION BASED ON DATA DRIVEN OPTIMIZATION

(71) Applicant: Tata Consultancy Services Limited, Mumbai (IN)

(72) Inventors: Saurabh Jaywant Desai, Pune (IN); Muralikrishnan Ramanujam, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 24 days.

(21) Appl. No.: 19/010,285

(22) Filed: Jan. 6, 2025

(65) Prior Publication Data

US 2025/0231042 A1 Jul. 17, 2025

(30) Foreign Application Priority Data

Jan. 16, 2024 (IN) .............................. 202421003182

(51) Int. Cl.
*G01C 21/00* (2006.01)

(52) U.S. Cl.
CPC ................................ *G01C 21/3807* (2020.08)

(58) Field of Classification Search
CPC ............................ G01C 21/00; G01C 21/3807
(Continued)

(56) References Cited

U.S. PATENT DOCUMENTS 11,487,018 B2 * 11/2022 Fowe ................. G01C 21/3822
11,587,004 B2 * 2/2023 Khan ...................... B60L 53/64
(Continued)

FOREIGN PATENT DOCUMENTS

| CN | 115292866 A | 11/2022 |
| CN | 115713146 A | 2/2023 |
| CN | 116739229 A | 9/2023 |

OTHER PUBLICATIONS

Campaña et al., "Optimal Planning of Electric Vehicle Charging Stations Considering Traffic Load for Smart Cities," World Electr. Veh. J., 14 (2023).

*Primary Examiner* — Andrew Joseph Rudy
(74) *Attorney, Agent, or Firm* — Finnegan, Henderson, Farabow, Garrett & Dunner, LLP

(57) ABSTRACT

This disclosure relates generally to identification of charging station location based on data driven optimization. Despite the rapid growth seen in adoption of EVs, several challenges have remained, with the major concern of choosing the location of the charging infrastructure is crucial. The state-of-art techniques to identify the location of charging infra-structure/station is based on pure optimization techniques using static number of charging stations, which may not effectively output the global optimal solution for the city as it is not performed at real-time. The disclosed technique is a flow-based solution approach that is based on daily traffic count data. The disclosed technique analyses traffic condition from vehicle count data, geography of the city or area of interest, road networks, charging station operation con-straints to identify a set of candidate locations required to cover entire city or area of the interest based on a score-based ranking of each candidate location.

15 Claims, 22 Drawing Sheets

(58) Field of Classification Search
USPC .......................................................... 701/409
See application file for complete search history.

(56) References Cited

U.S. PATENT DOCUMENTS

| | | | |
|---|---|---|---|
| 2023/0052733 A1* | 2/2023 | Beaurepaire ............ | B60L 53/68 |
| 2023/0205793 A1* | 6/2023 | Guo ................... | G01C 21/3863 |
| | | | 707/793 |

* cited by examiner

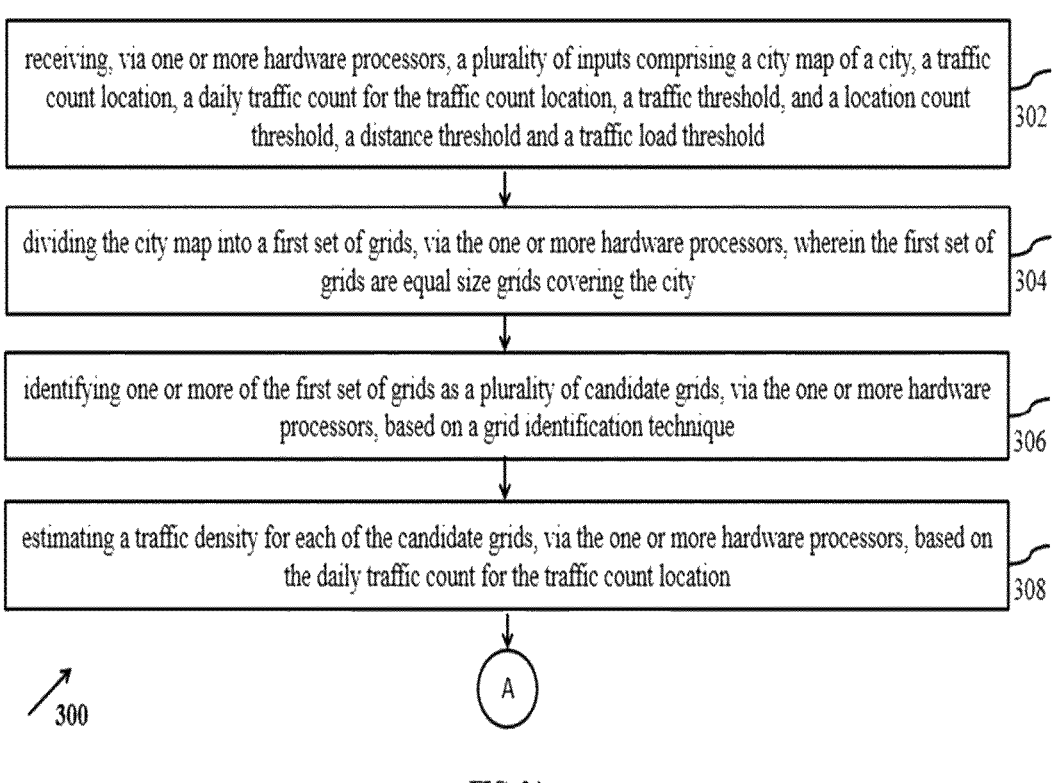

receiving, via one or more hardware processors, a plurality of inputs comprising a city map of a city, a traffic count location, a daily traffic count for the traffic count location, a traffic threshold, and a location count threshold, a distance threshold and a traffic load threshold
302 dividing the city map into a first set of grids, via the one or more hardware processors, wherein the first set of grids are equal size grids covering the city
304 identifying one or more of the first set of grids as a plurality of candidate grids, via the one or more hardware processors, based on a grid identification technique
306 estimating a traffic density for each of the candidate grids, via the one or more hardware processors, based on the daily traffic count for the traffic count location
308

clustering the first set of grids and the plurality of candidate grids to generate a set of clustered grids, via the one or more hardware processors, using a clustering technique based on a computed cumulative sum — 310 computing a total score, via the one or more hardware processors, wherein the total score is a summation of a distance penalty and a traffic penalty, wherein:

the distance penalty is computed based on the distance threshold and a maximum distance, wherein the maximum distance is computed between the first set of grids and the plurality of candidate grids, and the traffic penalty is computed based on the traffic density and the traffic load threshold in the first set of grids — 312

300

METHOD AND SYSTEM FOR IDENTIFICATION OF CHARGING STATION LOCATION BASED ON DATA DRIVEN OPTIMIZATION

PRIORITY CLAIM

The present application claims priority to Indian Application No. 202421003182, filed on Jan. 16, 2024. The entire contents of the aforementioned application are incorporated herein by reference.

TECHNICAL FIELD

The disclosure herein generally relates to identification of charging station location and, more particularly, to a method and a system for identification of charging station location based on data driven optimization.

BACKGROUND

The green technology revolution has led to rise in popularity of electric vehicles. The adoption of environmentally friendly modes of transportation such as Electric vehicle (EV) leads to significant reduction in greenhouse gas emissions. Unlike conventional petrol, gasoline or diesel-powered vehicles, EVs produce lower or zero tailpipe emissions, thus mitigating climate change.

Despite the rapid growth seen in adoption of EVs, several barriers such as high purchase costs, limited range, long charging time and lack of widespread charging infrastructures have remained as challenges. The major concern with EVs is lack of power and charging infrastructure. During the planning of charging infrastructure, choosing the location of the charging infrastructure is crucial.

The state-of-art techniques to identify the location of charging infrastructure/station are based on pure optimization techniques. The optimization techniques are based on a static number of charging stations, hence may not effectively output the global optimal solution for the city. Further very few techniques are implemented using data-based techniques, wherein the objective functions are selected based on nature of the data, which may leave gaps in the solution. Further, most existing techniques are not performed at real-time. Hence there is a requirement for a more robust technique for identification of the location of charging infrastructure at real-time.

SUMMARY

Embodiments of the present disclosure present technological improvements as solutions to one or more of the above-mentioned technical problems recognized by the inventors in conventional systems. For example, in one embodiment, a method for identification of charging station location based on data driven optimization is provided.

The system includes a memory storing instructions, one or more communication interfaces, and one or more hardware processors coupled to the memory via the one or more communication interfaces, wherein the one or more hardware processors are configured by the instructions to receive a plurality of inputs comprising a city map of a city, a traffic count location, a daily traffic count for the traffic count location, a traffic threshold, and a location count threshold, a distance threshold and a traffic load threshold. The system is further configured to divide the city map into a first set of grids, via the one or more hardware processors, wherein the first set of grids are equal size grids covering the city. The system is further configured to identify one or more of the first set of grids as a plurality of candidate grids, via the one or more hardware processors, based on a grid identification technique. The system is further configured to estimate a traffic density for each of the candidate grids, via the one or more hardware processors, based on the daily traffic count for the traffic count location. The system is further configured to cluster the first set of grids and the plurality of candidate grids to generate a set of clustered grids, via the one or more hardware processors, using a clustering technique based on a computed cumulative sum. The system is further configured to compute a total score, via the one or more hardware processors, wherein the total score is a summation of a distance penalty and a traffic penalty, wherein, the distance penalty is computed based on the distance threshold and a maximum distance, wherein the maximum distance is computed between the first set of grids and the plurality of candidate grids, and the traffic penalty is computed based on the traffic density and the traffic load threshold in the first set of grids. The system is further configured to identify a final set of candidate locations from the set of clustered grids using the traffic density, the distance, the traffic load threshold, and the distance threshold, based on an iterative optimization technique, via the one or more hardware processors, wherein the iterative optimization technique comprises performing for all sub-clusters in the set of clustered grids: identifying an candidate cluster from the set of clustered grids based on the traffic density, the distance, and the total score with the distance threshold and the traffic load threshold; identifying at least one candidate grid from the candidate cluster based on the total score and removing all the other grids except for the identified candidate grid from the set of clustered grids based on a selection-removal process; and selecting an candidate location from the identified at least one candidate grid, wherein the candidate location is selected for all sub-clusters in the set of clustered grids to form the final set of candidate locations.

In another aspect, a method for identification of charging station location based on data driven optimization is provided. The method includes receiving, via one or more hardware processors, a plurality of inputs comprising a city map of a city, a traffic count location, a daily traffic count for the traffic count location, a traffic threshold, and a location count threshold, a distance threshold and a traffic load threshold. The method includes dividing the city map into a first set of grids, via the one or more hardware processors, wherein the first set of grids are equal size grids covering the city. The method includes identifying one or more of the first set of grids as a plurality of candidate grids, via the one or more hardware processors, based on a grid identification technique. The method includes estimating a traffic density for each of the candidate grids, via the one or more hardware processors, based on the daily traffic count for the traffic count location. The method includes clustering the first set of grids and the plurality of candidate grids to generate a set of clustered grids, via the one or more hardware processors, using a clustering technique based on a computed cumulative sum. The method includes computing a total score, via the one or more hardware processors, wherein the total score is a summation of a distance penalty and a traffic penalty, wherein, the distance penalty is computed based on the distance threshold and a maximum distance, wherein the maximum distance is computed between the first set of grids and the plurality of candidate grids, and the traffic penalty is computed based on the traffic density and the traffic load threshold in the first set of grids. The method includes identifying a final set of candidate locations from the set of clustered grids using the traffic density, the distance, the traffic load threshold, and the distance threshold, based on an iterative optimization technique, via the one or more hardware processors, wherein the iterative optimization technique comprises performing for all sub-clusters in the set of clustered grids: identifying an candidate cluster from the set of clustered grids based on the traffic density, the distance, and the total score with the distance threshold and the traffic load threshold; identifying at least one candidate grid from the candidate cluster based on the total score and removing all the other grids except for the identified candidate grid from the set of clustered grids based on a selection-removal process; and selecting an candidate location from the identified at least one candidate grid, wherein the candidate location is selected for all sub-clusters in the set of clustered grids to form the final set of candidate locations.

In yet another aspect, a non-transitory computer readable medium for identification of charging station location based on data driven optimization is provided. The method includes receiving, via one or more hardware processors, a plurality of inputs comprising a city map of a city, a traffic count location, a daily traffic count for the traffic count location, a traffic threshold, and a location count threshold, a distance threshold and a traffic load threshold. The method includes dividing the city map into a first set of grids, via the one or more hardware processors, wherein the first set of grids are equal size grids covering the city. The method includes identifying one or more of the first set of grids as a plurality of candidate grids, via the one or more hardware processors, based on a grid identification technique. The method includes estimating a traffic density for each of the candidate grids, via the one or more hardware processors, based on the daily traffic count for the traffic count location. The method includes clustering the first set of grids and the plurality of candidate grids to generate a set of clustered grids, via the one or more hardware processors, using a clustering technique based on a computed cumulative sum. The method includes computing a total score, via the one or more hardware processors, wherein the total score is a summation of a distance penalty and a traffic penalty, wherein, the distance penalty is computed based on the distance threshold and a maximum distance, wherein the maximum distance is computed between the first set of grids and the plurality of candidate grids, and the traffic penalty is computed based on the traffic density and the traffic load threshold in the first set of grids. The method includes identifying a final set of candidate locations from the set of clustered grids using the traffic density, the distance, the traffic load threshold, and the distance threshold, based on an iterative optimization technique, via the one or more hardware processors, wherein the iterative optimization technique comprises performing for all sub-clusters in the set of clustered grids: identifying an candidate cluster from the set of clustered grids based on the traffic density, the distance, and the total score with the distance threshold and the traffic load threshold; identifying at least one candidate grid from the candidate cluster based on the total score and removing all the other grids except for the identified candidate grid from the set of clustered grids based on a selection-removal process; and selecting an candidate location from the identified at least one candidate grid, wherein the candidate location is selected for all sub-clusters in the set of clustered grids to form the final set of candidate locations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A-3C is a flow diagram illustrating a method (300) for identification of charging station location based on data driven optimization in accordance with some embodiments of the present disclosure.

DETAILED DESCRIPTION

Figure 1:
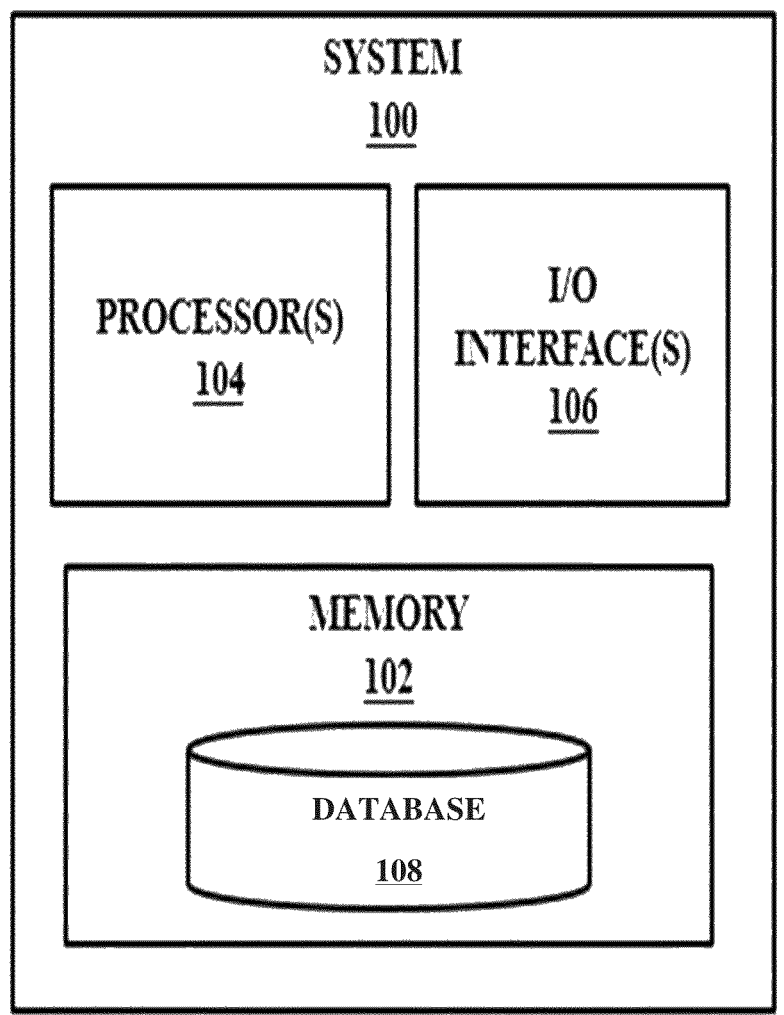
FIG. 1 illustrates an exemplary system for identification of charging station location based on data driven optimization according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The rise in popularity of electric vehicles (EVs) due to their potential of being a green mode of transport has brought continuous technology revolution and government policy support. EVs have achieved a significant development in recent years as the public's consciousness towards the impact of gasoline powered vehicles on the environment is rising to lead to the adoption of environmentally friendly modes of transportation such as EV's. However, despite the rapid growth seen in adoption of EVs, several barriers still exist, such as high purchase costs, limited range, long charging time and lack of widespread charging infrastructures, are big hurdles to the future growth. In the planning of EV related infrastructure, the location of the battery charging station location has great importance. The disclosure is a flow-based solution approach for identification of charging station location that is based on daily traffic count data using data driven optimization techniques.

Referring now to the drawings, and more particularly to FIG. 1 through FIG. 20, where similar reference characters denote corresponding features consistently throughout the figures, there are shown preferred embodiments, and these embodiments are described in the context of the following exemplary system and/or method.

FIG. 1 is an exemplary block diagram of a system 100 for identification of charging station location based on data driven optimization in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding for identification of charging station location based on data driven optimization. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
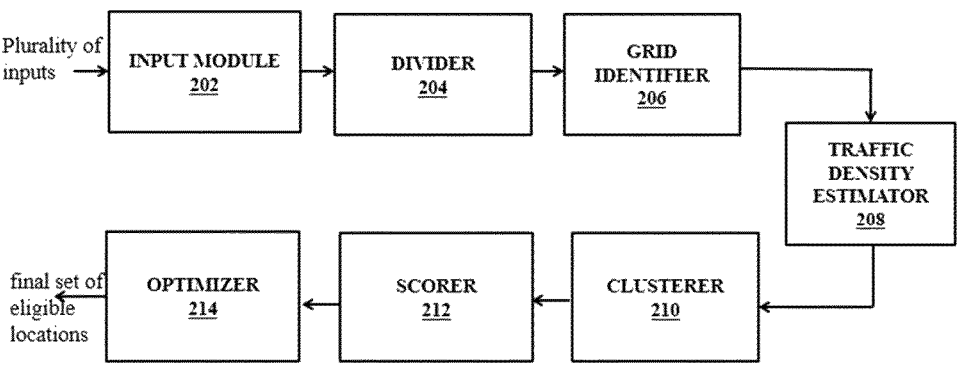
FIG. 2 is a functional block diagram for identification of charging station location based on data driven optimization according to some embodiments of the present disclosure.
Figure 3C:
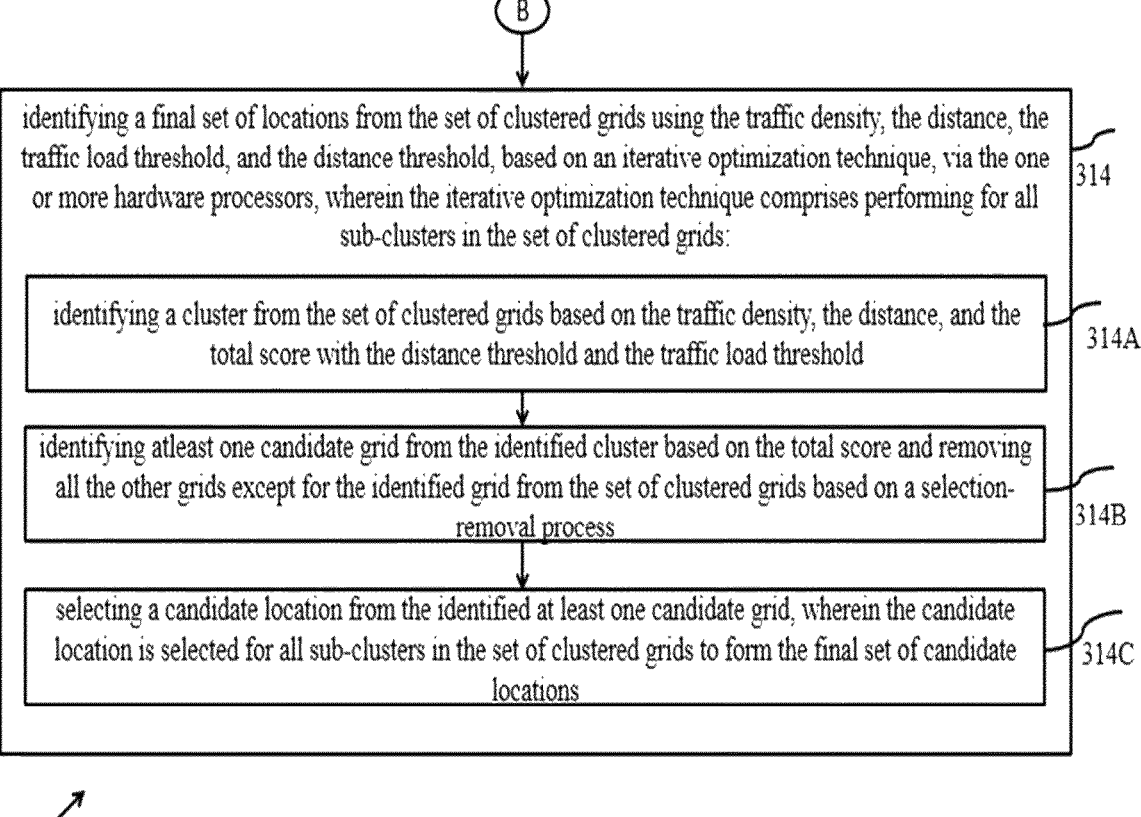

Functions of the components of system 100 are explained in conjunction with functional overview of the system 100 in FIG. 2 and flow diagram of FIG. 3A and FIG. 3C for identification of charging station location based on data driven optimization.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes for identification of charging station location based on data driven optimization.

As depicted in FIG. 2, the functional system 200 of the system 100 is configured for identification of charging station location based on data driven optimization.

The system 200 comprises an input module 202 configured for receiving a plurality of inputs comprising a city map of a city, a traffic count location, a daily traffic count for the traffic count location, a traffic threshold, and a location count threshold, a distance threshold and a traffic load threshold. The system 200 further comprises a divider 204 configured for dividing the city map into a first set of grids, wherein the first set of grids are equal size grids covering the city. The system 200 further comprises a grid identifier 206 configured for identifying one or more of the first set of grids as a plurality of candidate grids, based on a grid identification technique. The system 200 further comprises a traffic density estimator 208 configured for estimating the traffic density for each of the candidate grids based on the daily traffic count for each of the traffic count location. The system 200 further comprises clusterer 210 configured for clustering the first set of grids and the plurality of candidate grids to generate a set of clustered grids, using a clustering technique based on computing a cumulative sum. The system 200 further comprises scorer 212 configured for computing a total score, wherein the total score is a summation of a distance penalty and a traffic penalty. The system 200 further comprises optimizer 214 configured for identifying a final set of candidate locations from the set of clustered grids using the traffic density and the distance threshold based on an iterative optimization technique, wherein the iterative optimization technique comprises performing for all sub-clusters in the set of clustered grids.

The various modules of the system 100 and the functional blocks in FIG. 2 are configured for identification of charging station location based on data driven optimization are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIGS. 3A-3C. The FIGS. 3A-3C with reference to FIG. 1, is an exemplary flow diagram illustrating a method 300 for identification of charging station location based on data driven optimization using the system 100 of FIG. 1 according to an embodiment of the present disclosure.

The steps of the method of the present disclosure will now be explained with reference to the components of the system 100 of FIG. 1 for identification of charging station location based on data driven optimization and the modules 202-214 as depicted in FIG. 2 and the flow diagrams as depicted in FIGS. 3A-3C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of method 300, a plurality of inputs is received in the input module 202. The plurality of inputs comprising a city map of a city, a traffic count location, a daily traffic count for the traffic count location, a traffic threshold, a location count threshold, a distance threshold, and a traffic load threshold.

In an embodiment, the city map includes data in terms of co-ordinates, wherein the co-ordinates are translated from geographic data. The traffic count locations represent locations in the city where traffic count is measured. The daily traffic count indicates number of vehicles that has passed through the traffic count locations in a day. Further, the traffic threshold is determined based on a plurality of statistical techniques as a number above which traffic count location is categorized as high density/highly visited location and is used to find high density/highly visited locations. The location count threshold is utilized to identify the candidate street in the city.

The distance threshold is maximum distance between a user vehicle and a nearest charging station when the user is travelling through the city. The distance threshold helps user get services without depleting too much vehicle battery charge while reaching for battery recharge. The traffic load threshold is maximum traffic limit in service area of charging station. The city map also comprises a plurality of locations and a plurality of street.

At step 304 of method 300, the city map is divided into a first set of grids in divider 204. The first set of grids are equal size grids covering the city.

In an embodiment, the first set of grids are equal size grids—wherein in an example scenario the grid is one of a square shaped grid or a rectangular shaped grid. The entire city map is divided it several grids of a pre-defined size, wherein the pre-defined size is determined such that the grids formed are equal sized. In an example scenario the city map is a 2-Dimensional diagram with a X-axis and a Y-Axis, where a lower limit and an upper limit is defined at both the X-axis and the Y-Axis and the city map is partitioned into several intervals (pre-defined size) and perpendicular lines drawn through the city map from those intervals creating the square/rectangular grids. Similarly, several types of logic grids with different shapes can be generated.

Figure 4:
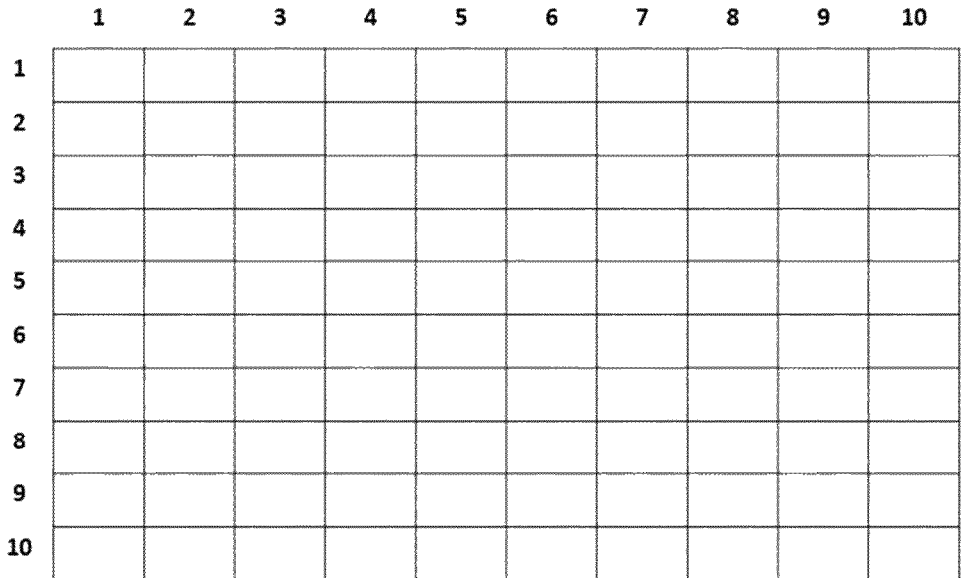
FIG. 4 illustrates a city map along with a plurality of grids in accordance with some embodiments of the present disclosure.
Figure 5:
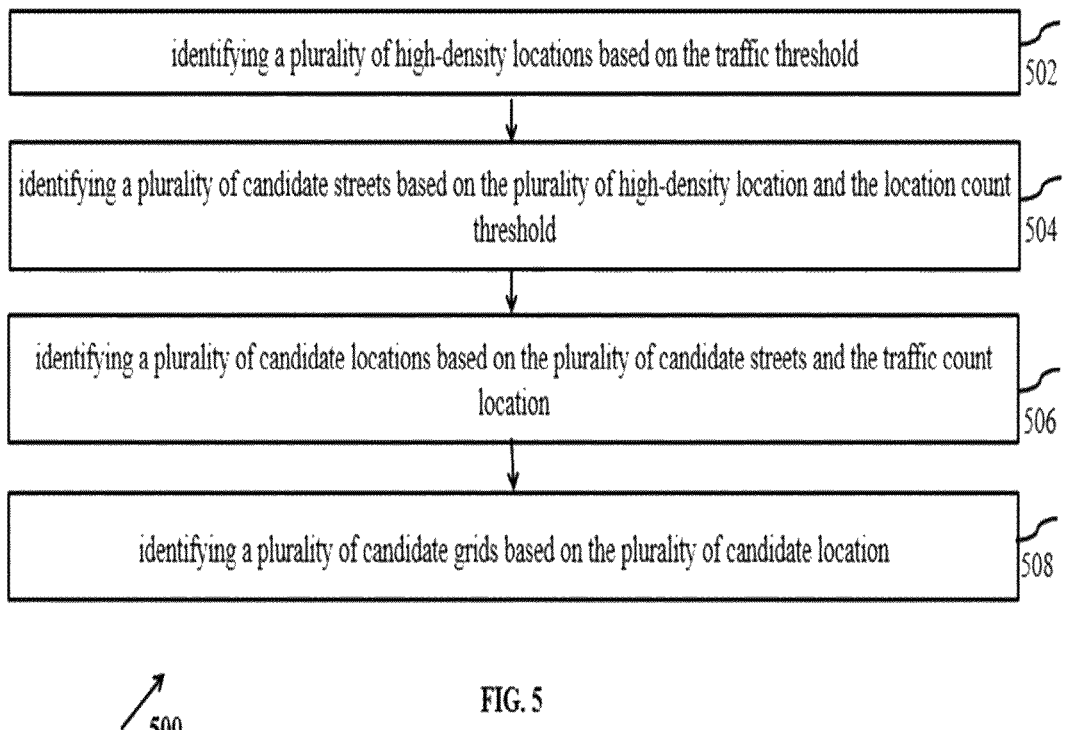
FIG. 5 is a flow diagram illustrating a method (500) for grid identification technique in accordance with some embodiments of the present disclosure.

In an example scenario, as shown in FIG. 4 the city map is divided into 10×10 equal square grids.

At step 306 of method 300, one or more of the first set of grids are identified as a plurality of candidate grids in grid identifier 206. The identification of plurality of candidate grids is based on a grid identification technique. The grid identification technique is explained using FIG. 5.

At step 502 of method 500, a plurality of high-density locations is identified based on the traffic threshold.

In an embodiment, the high-density location is identified from the plurality of locations, wherein a location from the plurality of locations having a daily traffic count higher than the "traffic threshold" is identified as the high-density location.

At step 504 of method 500, a plurality of candidate streets is identified from the plurality of streets, wherein a street from the plurality of streets is identified as a candidate street based on the plurality of high-density location and the location count threshold In an embodiment, the plurality of candidate streets is identified when the Street which has total number of the high-density locations more than the location count threshold.

At step 506 of method 500, a plurality of candidate locations is identified based on the plurality of candidate streets and the traffic count location.

In an embodiment, upon identification of streets as a candidate street, the all the traffic count locations falling on those "candidate street" are selected as the candidate locations.

At step 508 of method 500, a plurality of candidate grids is identified based on the plurality of candidate location.

In an embodiment, the first set of grids which contain one of the plurality of candidate locations is identified as candidate grid. The plurality of candidate grids thus identified are a subset of the first set of grids.

Figure 6:
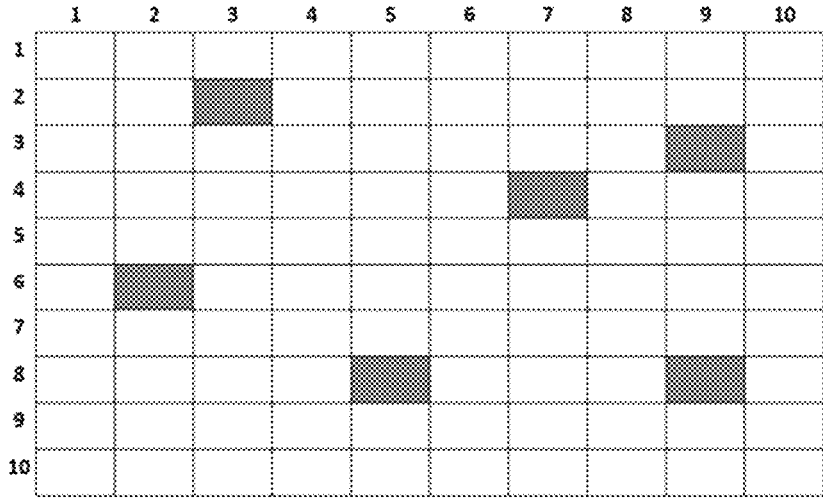
FIG. 6 illustrates plurality of candidate grids identified in the city map in accordance with some embodiments of the present disclosure.

In an example scenario, as shown in FIG. 6 the plurality of candidate grids is identified and highlighted in the FIG. 6, where the highlighted grid indicates the plurality of candidate grids while the remaining grids indicate the first set of grids. At step 308 of method 300, the traffic density is estimated for each of the candidate grids in traffic density estimator 208. The traffic density is estimated based on the daily traffic count for each of the traffic count location.

Figure 7:
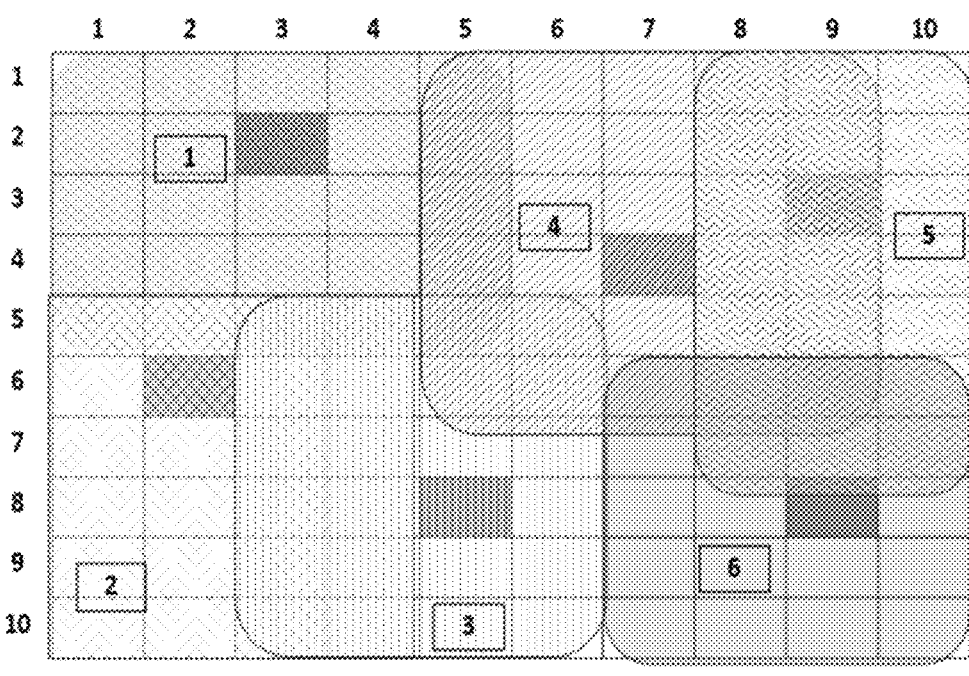
FIG. 7 illustrates the clustered grids in the city map in accordance with some embodiments of the present disclosure.
Figure 8:
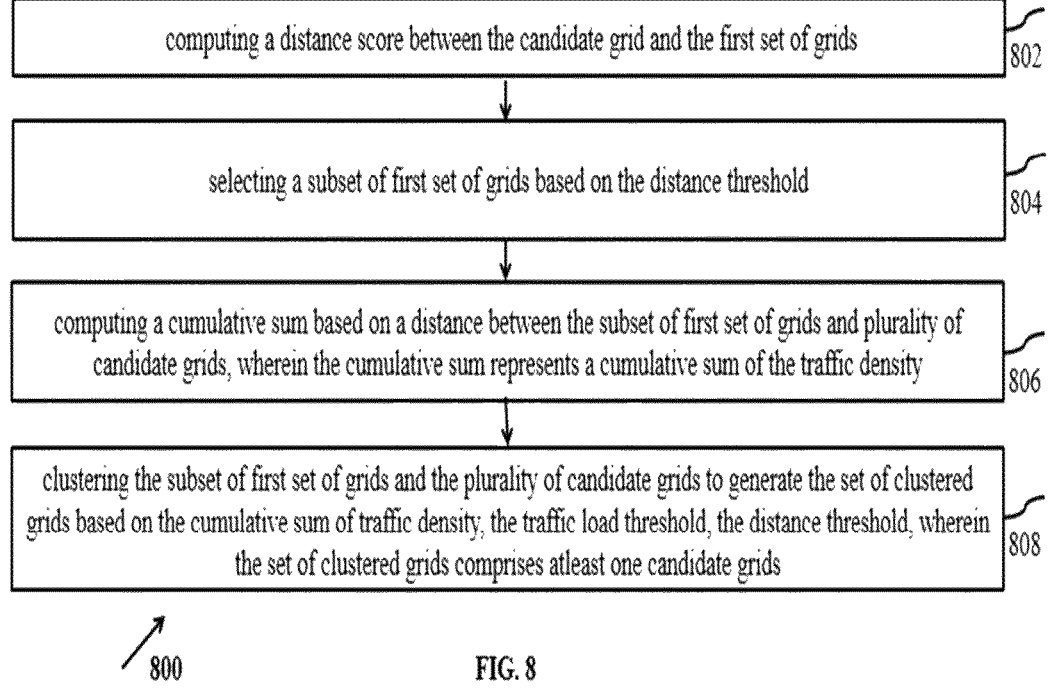
FIG. 8 is a flow diagram illustrating a method (800) for performing the clustering technique in accordance with some embodiments of the present disclosure.

In an embodiment, the traffic density is defined as follows:

$$TD_j = \frac{\sum_{i=1}^{n_j} T_{ij}}{n_j}, \forall\, i \in \text{grid}_j = 0, \text{ if } T_{ij} = \phi\, \forall\, i \in \text{grid}_j \qquad (1)$$

where, $n_j$=total number of traffic count points in the $\text{grid}_j$ $T_{ij}$=Daily traffic count in $i^{th}$ location from $j^{th}$ grid, and $TD_j$=traffic density at $\text{grid}_j$ At step 310 of method 300, the first set of grids and the plurality of candidate grids is clustered to generate a set of clustered grids in the clusterer 210. In an example scenario, the grids are clustered as shown in FIG. 7.

Clustering is performed using a clustering technique based on computing a cumulative sum. The clustering technique is explained with reference to FIG. 8 as below:

At step 802 of method 800, a distance is computed between the candidate grid and the first set of grids.

In an embodiment, the distance is computed for each candidate grid from the plurality of candidate grids with all the first set of grids from the first set of grids based on a shortest distance algorithm that includes one of a Dijkstra's algorithm, Kruskal's algorithm based on distance metric such as Haversine distance, Manhatten distance, Euler distance and so on.

In an example scenario, given a city map of Bengaluru city with a Distance Threshold equal to 10 km, and the Traffic Load Threshold equal to 11000 vehicle/day and the traffic load is given. The distance is computed between the candidate grid and the first set of grids as shown below

TABLE 1

Distance computed

| First set of Grid Number | Distance | Traffic load |
|---|---|---|
| 1 | 1 | 1321 |
| 2 | 1 | 1110 |
| 3 | 10 | 1822 |
| 4 | 7 | 2183 |
| 5 | 4 | 1139 |
| 6 | 12 | 1460 |
| 7 | 13 | 2129 |
| 8 | 6 | 619 |
| 9 | 13 | 561 |
| 10 | 13 | 2047 |
| 11 | 3 | 1032 |
| 12 | 2 | 1507 |
| 13 | 6 | 564 |
| 14 | 5 | 2185 |
| 15 | 13 | 1256 |

At step 804 of method 800, a subset of first set of grids is selected based on the distance threshold.

In an embodiment, a subset of first set of grids selected from the first set of grids, wherein all first set of grids having a distance less than the distance threshold are selected for next step as the subset of first set of grid.

In an example scenario, with furtherance to Table 1, the subset of first set of grid is selected based on the distance threshold, which in the given case is 10 Kms, hence the first set of grids with distance more than 10 is not considered. The subset of first set of grids is selected is shared below:

TABLE 2

Selected subset of first set of grids.

| First set of Grid Number | Distance | Traffic load |
|---|---|---|
| 1 | 1 | 1321 |
| 2 | 1 | 1110 |
| 12 | 2 | 1507 |
| 11 | 3 | 1032 |
| 5 | 4 | 1139 |
| 14 | 5 | 2185 |
| 8 | 6 | 619 |
| 13 | 6 | 564 |
| 4 | 7 | 2183 |
| 3 | 10 | 1822 |

At step 806 of method 800, a cumulative sum is computed based on the distance between the subset of first set of grids and plurality of candidate grids. The cumulative sum represents a cumulative sum of the traffic density.

In an embodiment, each first set of grid from the subset of "first set of grid" are sorted in an increasing order based on the distance between them and a selected "candidate grid". Upon ordering the subset of first set of grids, a cumulative traffic density is computed between consecutive first set of grid as shown below for the example scenario used in Table 1 and Table 2 and the same is shared below in Table 3;

TABLE 3

Computation of cumulative sum

| First set of Grid number | Distance | Traffic load | Cumulative Traffic Load |
|---|---|---|---|
| 1 | 1 | 1321 | 1321 |
| 2 | 1 | 1110 | 2431 |
| 12 | 2 | 1507 | 3938 |
| 11 | 3 | 1032 | 4970 |
| 5 | 4 | 1139 | 6109 |
| 14 | 5 | 2185 | 8294 |
| 8 | 6 | 619 | 8913 |
| 13 | 6 | 564 | 9477 |
| 4 | 7 | 2183 | 11660 |
| 3 | 10 | 1822 | 13482 |

At step 808 of method 800, the subset of first set of grids and the plurality of candidate grids is clustered to generate the set of clustered grids. The set of clustered grids comprises at least one candidate grids.

The set of clustered grids is generated based on a cumulative sum of traffic density, the traffic load threshold, and the distance threshold.

In an embodiment, the subset of first set of grids is selected based on the distance threshold. The selected set of clustered grids is generated from subset of first set of grids with their corresponding cumulative traffic density lower that the traffic load threshold.

In furtherance to the example scenario shared in Table 1, 2 and 3, The set of clustered grids is generated based on a comparison between the cumulative sum of traffic density and the traffic load threshold, wherein for the given scenario the traffic load threshold is equal to 11000 vehicle/day. Hence the first set of grids with traffic load threshold less than 11000 vehicle/day is clustered into a candidate cluster.

TABLE 4

Selection of subset of first set of grids for candidate cluster.

| First set of Grid Number | Distance | Traffic load | Cumulative Traffic Load |
|---|---|---|---|
| 1 | 1 | 1321 | 1321 |
| 2 | 1 | 1110 | 2431 |
| 12 | 2 | 1507 | 3938 |
| 11 | 3 | 1032 | 4970 |
| 5 | 4 | 1139 | 6109 |
| 14 | 5 | 2185 | 8294 |
| 8 | 6 | 619 | 8913 |
| 13 | 6 | 564 | 9477 |

The set of clustered grids contains at least one "candidate grid", including selected "candidate grid".

At step 312 of the method 300, a total score is computed in the scorer 212. The total score is a summation of a distance penalty and a traffic penalty, where:

The distance penalty is computed based on the distance threshold and a maximum distance, wherein the maximum distance is computed between the first set of grids and the plurality of candidate grids.

The traffic penalty is computed based on the traffic density and the traffic load threshold in the first set of grids.

In an embodiment, the distance penalty is computed as:

$$Dist_{pen_j} = \frac{Max_{dist}}{Dist_{Thres}} \qquad (2)$$

where, $Max_{dist}$=Maximum distance between the evaluated Charging station and the Filtered grids identified with it i $Dist_{thes}$=Maximum service distance that charging station should ideally serve $Dist_{pen_j}$=Distance penalty for $j^{th}$ eligible grid In an embodiment, the traffic penalty is computed as:

$$Traffic_{pen_j} = \frac{Trafload_{thres} - Traffic_{load}}{Trafload_{thres}}, \qquad (3)$$

$$if \ |Trafload_{thres} - Traffic_{load}| > Traffic_{tol} = 0,$$

otherwise where, $$Traffic_{load} = \sum_i TD_i \ \forall \ i \ mapped \ to \ j^{th} \ eligile \ grid \qquad (4)$$

$Traffic_{tol}$ = Tolerence band for total traffic to be served $Traffic_{pen_j}$ = Traffic penalty for $j^{th}$ eligible grid In an embodiment, the total score is computed as:

$$Total_{score_j} = \left( w_1 * Dist_{pen_j} + w_2 * Traffic_{pen_j} \right) \qquad (5)$$

where, $\{w_1, w_2\}$ are the weightages, and $Total_{score_j}$ for $j^{th}$ eligible grid.

At step 314 of method 300, a final set of candidate locations is identified from the set of clustered grids in the optimizer 214. The final set of candidate locations is identified using the traffic density, the traffic load threshold and the distance threshold based on an iterative optimization technique. The iterative optimization technique is a data-driven technique, that comprises of performing steps 314A to 314C for all sub-clusters in the set of clustered grids:

At step 314A of method 300, a candidate cluster is identified from the set of clustered grids based on the traffic density and the total score.

In an embodiment, the first set of grids having cumulative summation of traffic density less than the traffic_load threshold are selected as the set of first set of grids. The set of first set of grids is also referred to as a set of clusters. The total score is computed for each iteration, hence a candidate grid is identified as the first set of grids having cumulative summation of traffic density less than the traffic_load threshold for every iteration.

At step 314B of method 300, a tleast one candidate grid is identified from the candidate cluster based on the total score.

Further, all the other grids except for the identified candidate grid are removed from the set of clustered grids based on a selection-removal process. The identified candidate grid is further included in the final set of candidate locations and will not be used for the next iterations.

In an embodiment, the clusters having lower scores are identified as the candidate cluster.

Figure 9:
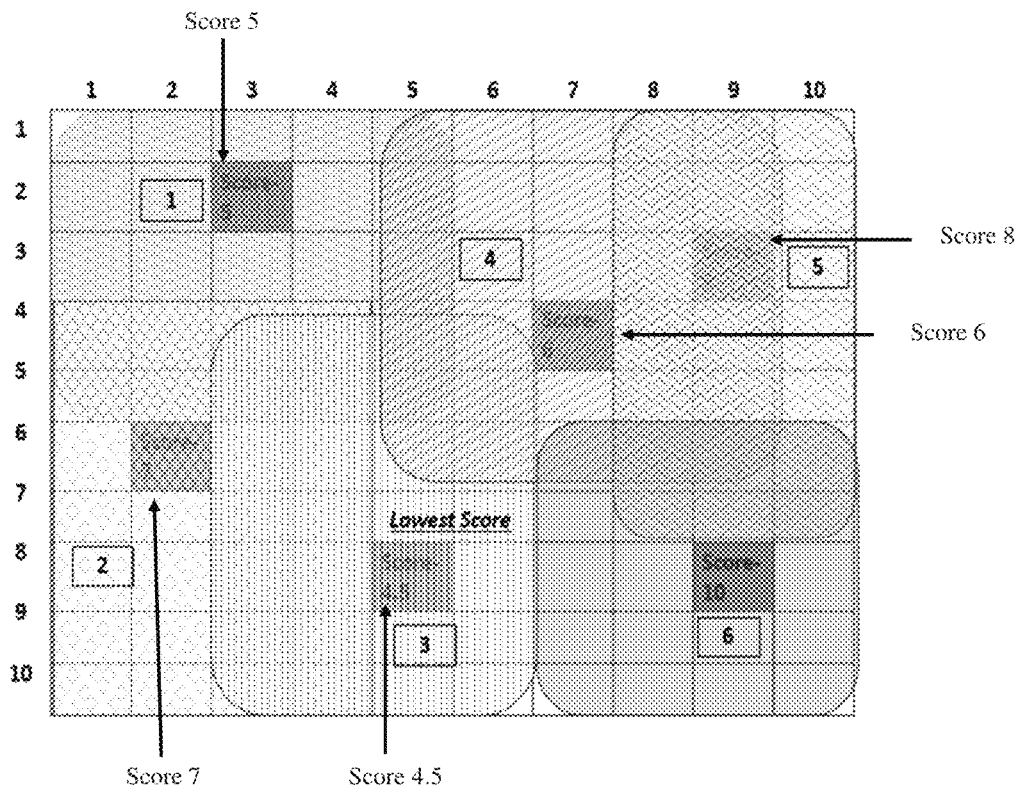
FIG. 9 to FIG. 18 illustrate the identification of a final set of candidate locations in the city map in accordance with some embodiments of the present disclosure.
Figure 10:
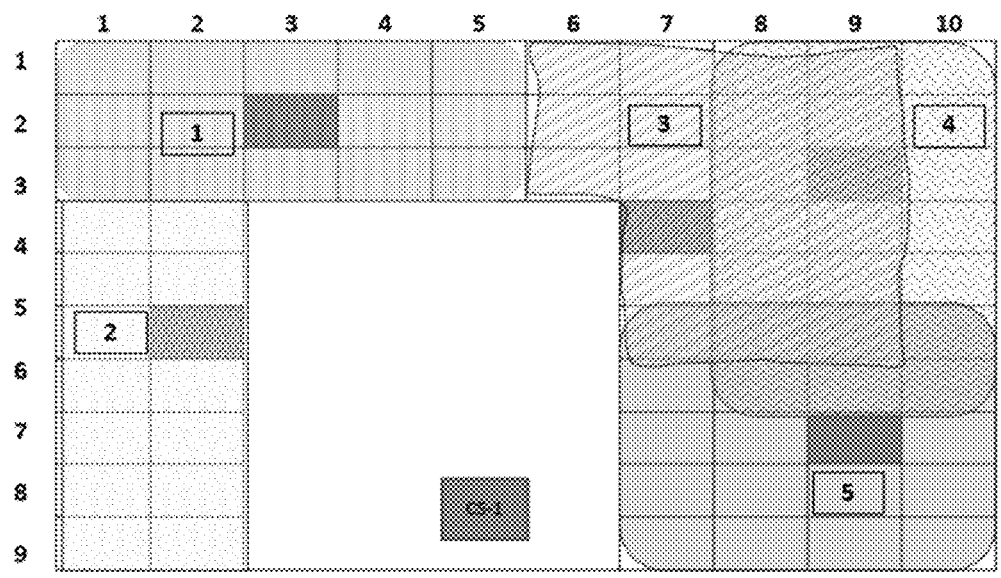

In the example scenario as shown in FIG. 9, the total score is estimated for each of the clusters, wherein the cluster 3 with total score 4.5 is identified as the cluster with least score. The candidate grid is selected and removed while the other grids are retained as shown in FIG. 10.

At step 314C of method 300, a candidate location is selected from the identified candidate grid. The candidate location selected for all sub-clusters in the set of clustered grids to form the final set of candidate locations.

Figure 11:
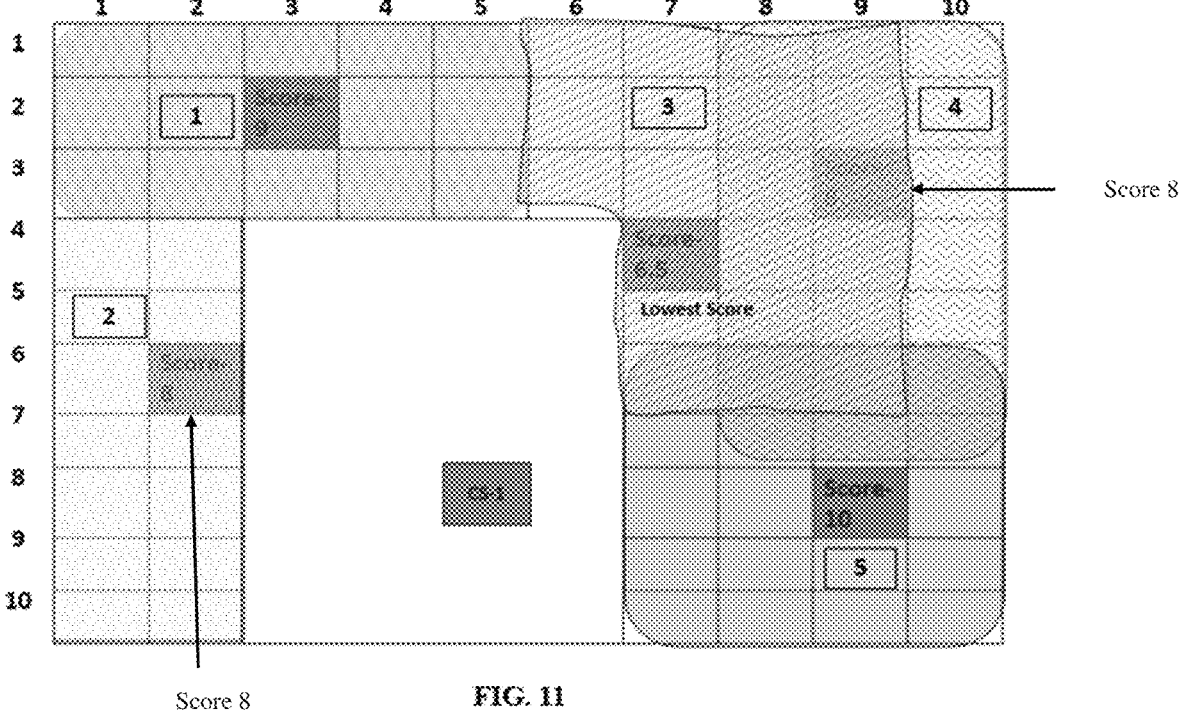

In an embodiment, any candidate location falling within the candidate grid is selected as final location. The high-density location within the selected grid may have more than one candidate location, in such a case, the candidate location with lowest total score is selected as candidate location. The selection of the candidate location from the identified candidate grid. The selection of the candidate location from the identified candidate grid is explained in example scenario as shown in FIG. 10 and FIG. 11, the cluster 3 has two high-density locations, with total scores 3 (co-ordinates 4,7) and 7 (co-ordinates 3,9). In this example, the high-density locations with total scores 3 is selected as an candidate location as it has a lower total score compared to the high-density locations with total scores 7

The above steps 314A to 314C is performed for all sub-clusters in the set of clustered grids to identify the final set of candidate locations.

Figure 12:
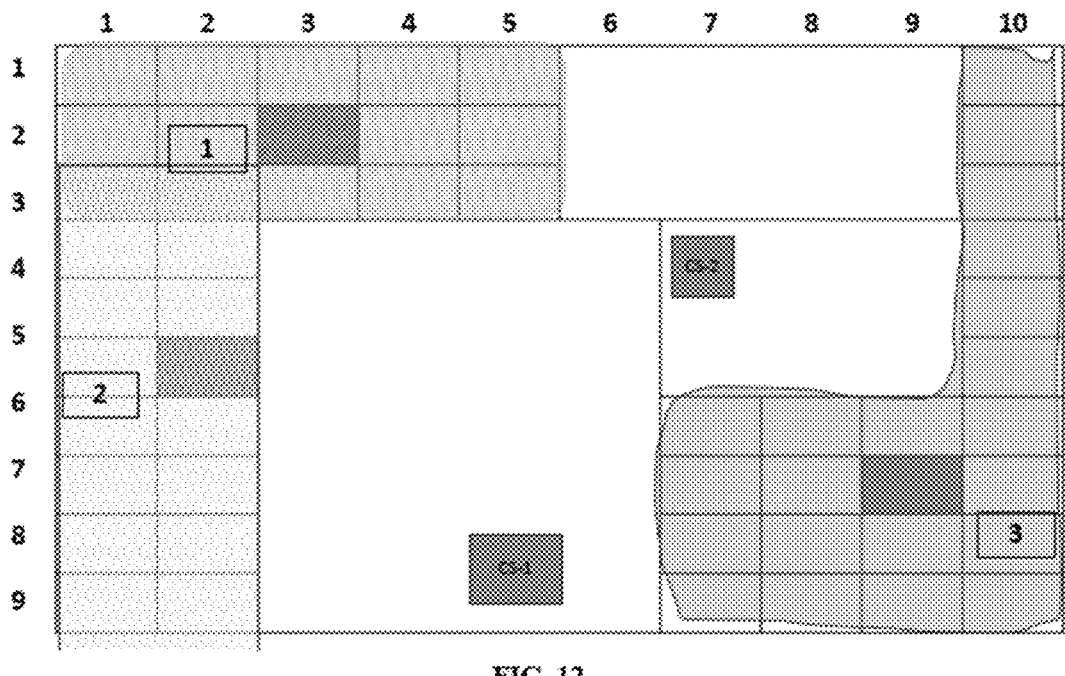
Figure 13:
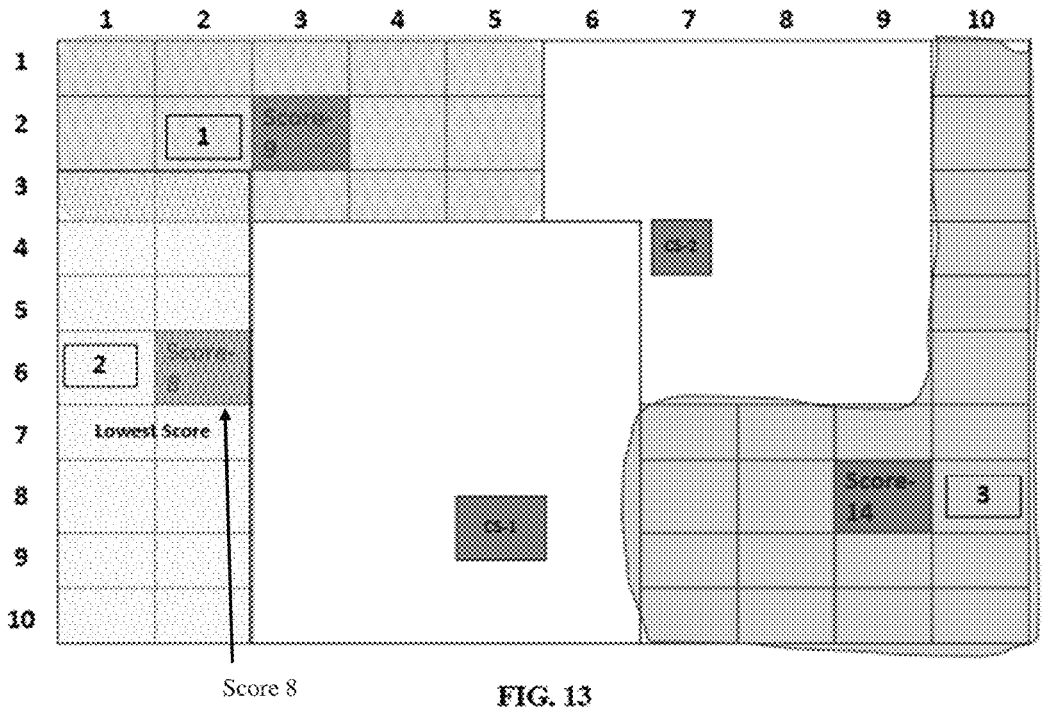
Figure 14:
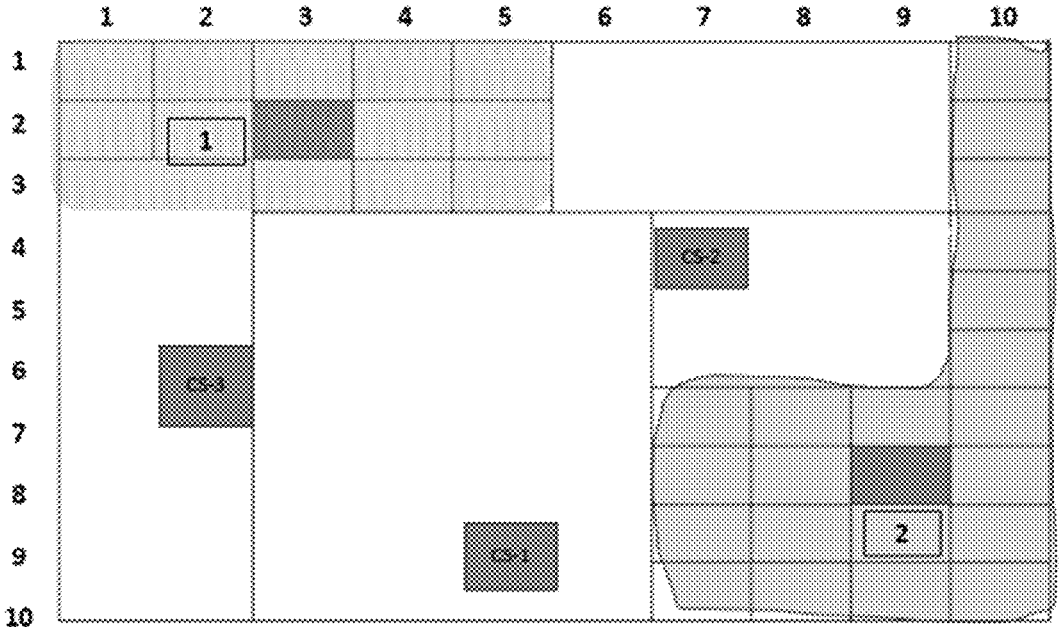
Figure 15:
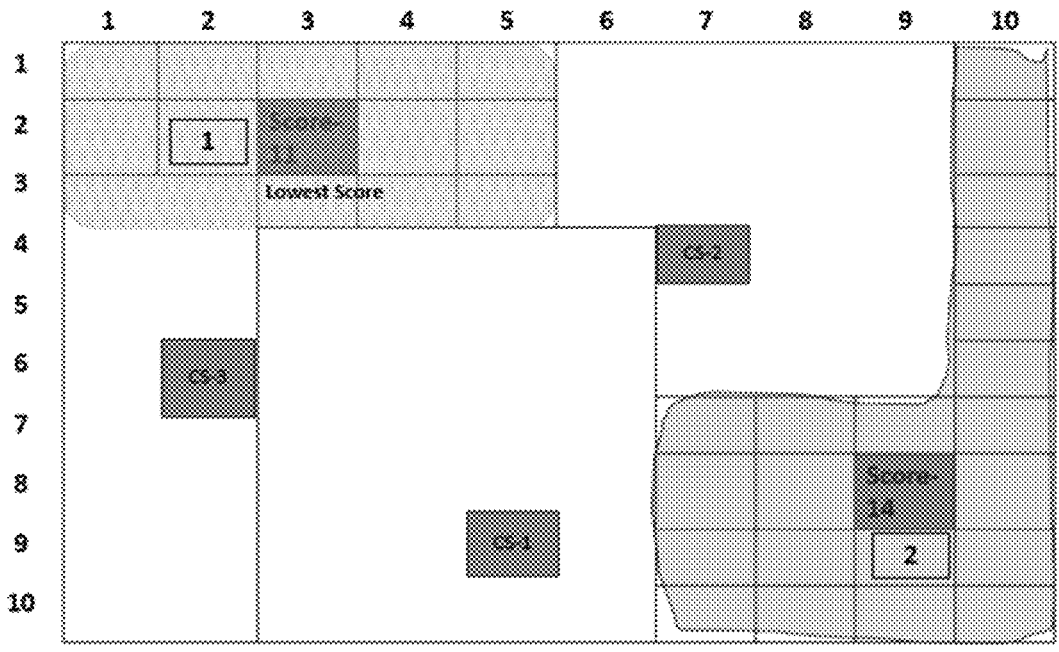
Figure 16:
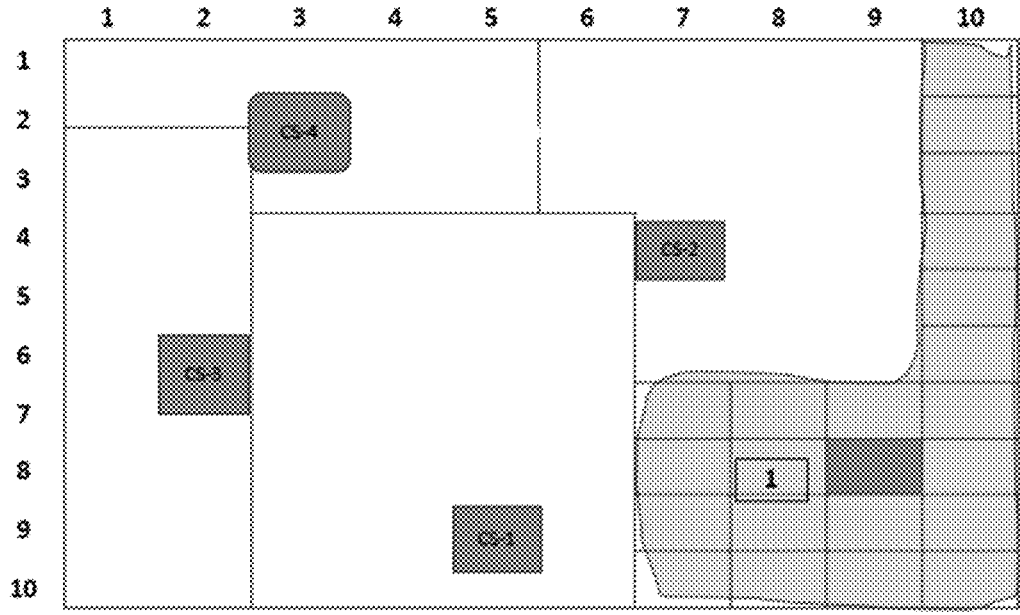
Figure 17:
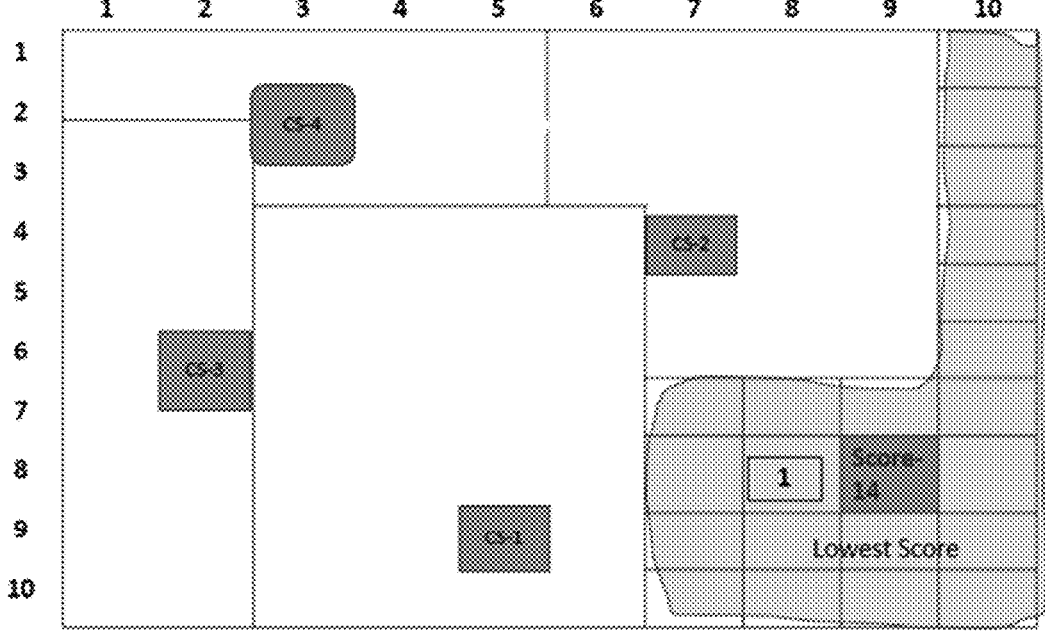
Figure 18:
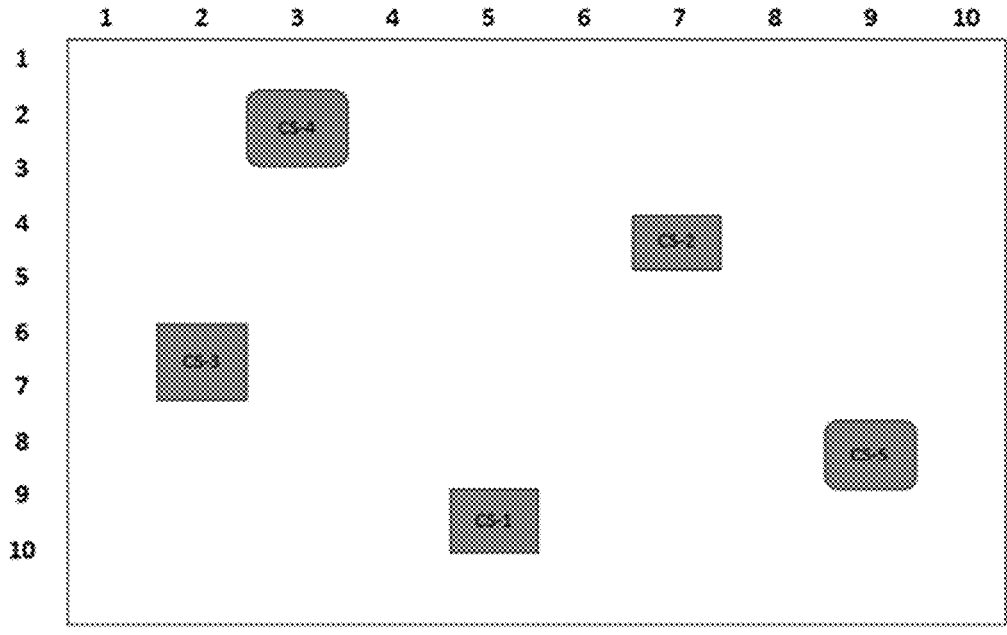
Figure 19:
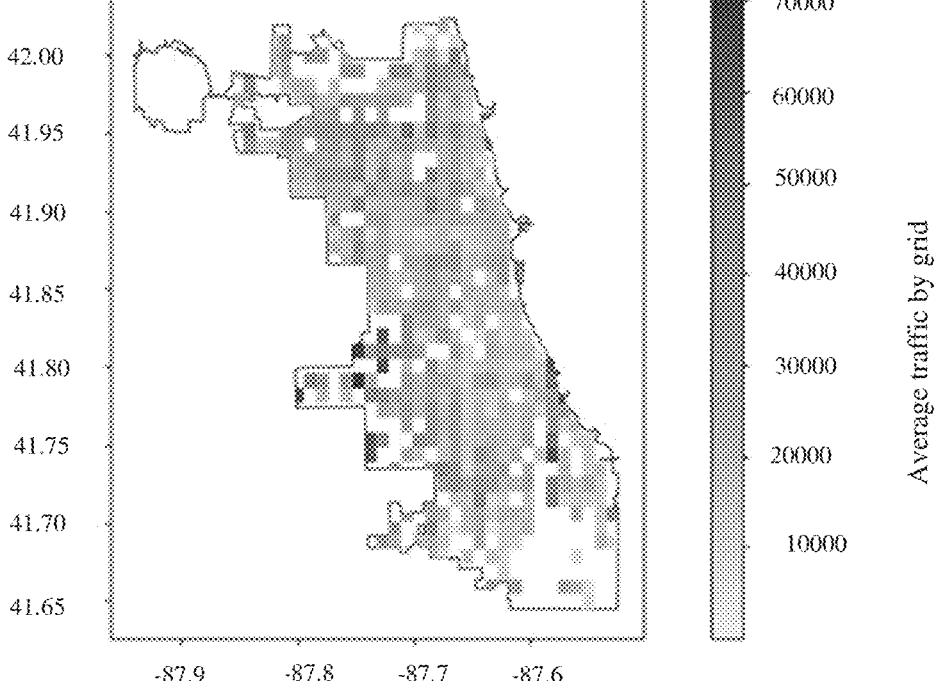
FIG. 19 illustrates grid wise average traffic density during the experimentation for identification of charging station location based on data driven optimization in accordance with some embodiments of the present disclosure.
Figure 20:
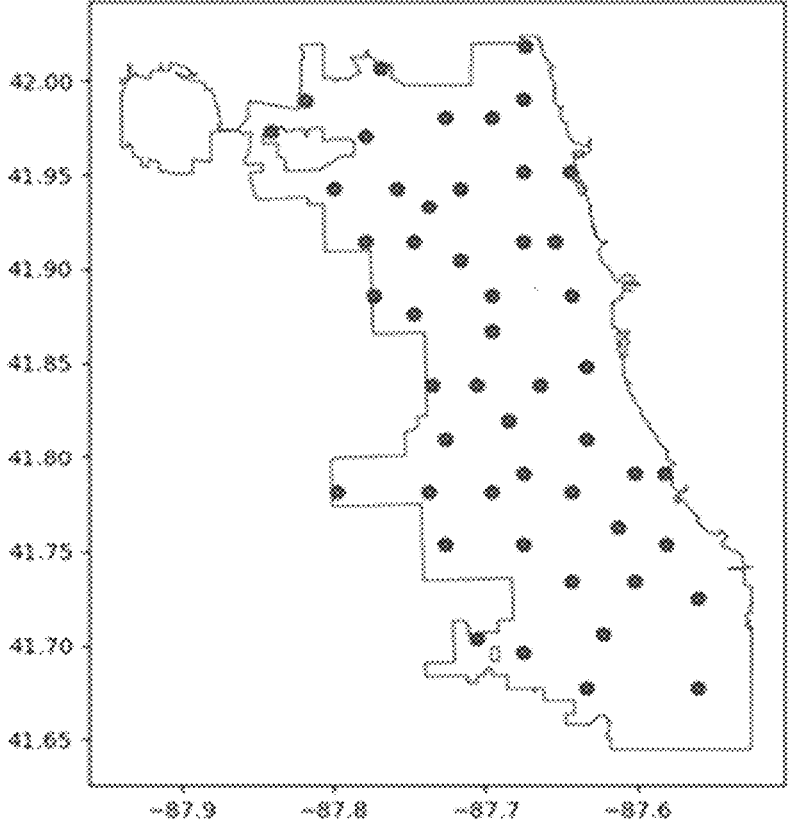
FIG. 20 illustrates a final set of candidate locations identified during the experimentation for identification of charging station location based on data driven optimization in accordance with some embodiments of the present disclosure.

In the first iteration, the cluster 3 has lowest total score, hence the candidate location within cluster 3 is identified within the final set of candidate locations as CS-1, and the cluster 3 is removed. For the second iteration, the traffic density and the total score are updated and then the candidate cluster is selected, wherein cluster 3 has a lowest total score of 3 at co-ordinates 4,7. Further cluster 3 also has another candidate location with a total score of 8 at co-ordinate 3,9. However among the two candidate locations, the candidate location with lower score is selected as CS-2 as shown in FIG. 11 and FIG. 12. Further for the third iteration, the total score are updated and then the candidate cluster is selected, wherein cluster 2 is identified as the candidate cluster and the high-density locations with total scores 8 is selected as a candidate location for the final set of candidate locations as CS-3 as shown in FIG. 13 and FIG. 14. For the fourth iteration, the total score are updated and then the candidate cluster is selected, wherein cluster 1 is identified as the candidate cluster and the high-density locations with total scores 11 is selected as a candidate location for the final set of candidate locations as CS-4 as shown in FIG. 15 and FIG. 16. For the final iteration, the remaining cluster 1 is identified as the candidate cluster and the high-density locations with total scores 14 is selected as a candidate location for the final set of candidate locations as CS-5 as shown in FIG. 17 and FIG. 18. Hence in FIG. 18, the final set of candidate locations are identified.

EXPERIMENTS

An experiment has been set-up to understand the performance of the for identification of charging station location based on data driven optimization by considering an use case example of City of Chicago. Chicago has very good road connectivity. The length of the road network totals to ~1900 km in length that spans to all parts of the city. All the road network data including geometric data of networks within the city is collected from Candidate streets data made available by Chicago municipal corporation and the streets are classified into 15 street types. Further average traffic count data made available by Chicago municipal corporation is used for this analysis. Data is collected for 1279 locations, falling on 251 streets, which contains total number of vehicles passing through each location in one day. Dataset also contains the coordinates of those locations in terms of latitude and longitude, as well as date of count. Average traffic count data contains a traffic count of important locations in the city. It has a range of 700 to 165200 vehicles passing through traffic collection point in a day. Most of the traffic count points see total number of vehicles from ~10000 to ~50000 in day passing from it. Using this data, average traffic per grid is calculated as per described in the equation (1). Grid wise average traffic density is shown in the FIG. 19. The disclosed technique is applied on the Chicago city map and a final set of candidate locations is as shown in the FIG. 20.

Further, the disclosed technique has been compared with a K-medoids algorithm, wherein the K-Medoids algorithm selects the cluster centers from the data points provided for the training. The disclosed technique recommends a total number of 46 charging stations to be established to cover entire the city meeting all the criterions of maximum distance and maximum traffic load, while the K-Medoids algorithm suggested total number of 43 clusters, i.e. to open charging center at 43 medoids. Hence it can inferred that the disclosed technique performs better than the K-medoids algorithm.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

This disclosure relates generally to identification of charging station location based on data driven optimization. The disclosed technique is a flow-based solution approach that is based on Daily traffic count data. The disclosed technique analyses, traffic condition from vehicle count data, geography of the city or area of interest, road networks, charging station operation constraints etc. to identify a set of candidate locations required to cover entire city or area of the interest based on a score-based ranking of each candidate location It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, a plurality of inputs comprising a city map of a city, a traffic count location, a daily traffic count for the traffic count location, a traffic threshold, and a location count threshold, a distance threshold and a traffic load threshold;
dividing the city map into a first set of grids, via the one or more hardware processors, wherein the first set of grids are equal size grids covering the city;
identifying one or more of the first set of grids as a plurality of candidate grids, via the one or more hardware processors, based on a grid identification technique;
estimating a traffic density for each of the candidate grids, via the one or more hardware processors, based on the daily traffic count for the traffic count location);
clustering the first set of grids and the plurality of candidate grids to generate a set of clustered grids, via the one or more hardware processors, using a clustering technique based on a computed cumulative sum;

computing a total score, via the one or more hardware processors, wherein the total score is a summation of a distance penalty and a traffic penalty, wherein, the distance penalty is computed based on the distance threshold and a maximum distance, wherein the maximum distance is computed between the first set of grids and the plurality of candidate grids, and the traffic penalty is computed based on the traffic density and the traffic load threshold in the first set of grids; and identifying a final set of locations from the set of clustered grids using the traffic density, the distance, the traffic load threshold, and the distance threshold, based on an iterative optimization technique, via the one or more hardware processors, wherein the iterative optimization technique comprises performing for all sub-clusters in the set of clustered grids:

identifying a cluster from the set of clustered grids based on the traffic density, the distance, and the total score with the distance threshold and the traffic load threshold;

identifying at least one candidate grid from the identified cluster based on the total score and removing all the other grids except for the identified grid from the set of clustered grids based on a selection-removal process; and selecting a candidate location from the identified at least one candidate grid, wherein the candidate location is selected for all sub-clusters in the set of clustered grids to form the final set of candidate locations.

2. The method of claim 1, wherein the grid identification technique comprises:

identifying a plurality of high-density locations based on the traffic threshold;

identifying a plurality of candidate streets based on the plurality of high-density location and the location count threshold;

identifying a plurality of candidate locations based on the plurality of candidate streets and the traffic count location; and identifying a plurality of candidate grids based on the plurality of candidate location.

3. The method of claim 1, wherein the clustering technique performed for each candidate grid from the plurality of candidate grids, comprises:

computing a distance score between the candidate grid and the first set of grids;

selecting a subset of first set of grids based on the distance threshold;

computing a cumulative sum based on a distance between the subset of first set of grids and plurality of candidate grids, wherein the cumulative sum represents a cumulative sum of the traffic density; and clustering the subset of first set of grids and the plurality of candidate grids to generate the set of clustered grids based on the cumulative sum of traffic density, the traffic load threshold, the distance threshold, wherein the set of clustered grids comprises at least one candidate grids.

4. The method of claim 1, wherein computation of the distance penalty is expressed as:

$$Dist_{pen_j} = \frac{Max_{dist}}{Dist_{Thres}}$$

where, $Max_{dist}$=Maximum distance between the evaluated Charging station and the Filtered grids identified with it i, $Dist_{thes}$=Maximum service distance that charging station should ideally serve, and $Dist_{pen_j}$=Distance penalty for $j^{th}$ eligible grid.

5. The method of claim 1, wherein computation of the traffic penalty is expressed as:

$$Traffic_{pen_j} = \frac{Trafload_{thres} - Traffic_{load}}{Trafload_{thres}},$$

$$\text{if } |Trafload_{thres} - Traffic_{load}| > Traffic_{tol} = 0,$$

$$\text{otherwise where,}$$

$$Traffic_{load} = \sum_i TD_i \; \forall \; i \text{ mapped to } j^{th} \text{ eligile grid}$$

$$Traffic_{tol} = \text{Tolerence band for total traffic to be served}$$

$$Traffic_{pen_j} = \text{Traffic penalty for } j^{th} \text{ eligible grid.}$$

6. A system, comprising:

a memory storing instructions;

one or more communication interfaces; and one or more hardware processors coupled to the memory via the one or more communication interfaces, wherein the one or more hardware processors are configured by the instructions to:

receive, via one or more hardware processors, a plurality of inputs comprising a city map of a city, a traffic count location, a daily traffic count for the traffic count location, a traffic threshold, and a location count threshold, a distance threshold and a traffic load threshold;

divide the city map into a first set of grids, via the one or more hardware processors, wherein the first set of grids are equal size grids covering the city;

identify one or more of the first set of grids as a plurality of candidate grids, via the one or more hardware processors, based on a grid identification technique;

estimate the traffic density for each of the candidate grids, via the one or more hardware processors, based on the daily traffic count for each of the traffic count location;

cluster the first set of grids and the plurality of candidate grids to generate a set of clustered grids, via the one or more hardware processors, using a clustering technique based on computing a cumulative sum;

compute a total score, via the one or more hardware processors, wherein the total score is a summation of a distance penalty and a traffic penalty, where:

the distance penalty is computed based on the distance threshold and a maximum distance, wherein the maximum distance is computed between the first set of grids and the plurality of candidate grids; and the traffic penalty is computed based on the traffic density and the traffic load threshold in the first set of grids;

identify a final set of candidate locations from the set of clustered grids using the traffic density, the distance, the traffic load threshold and the distance threshold based on an iterative optimization technique, via the one or more hardware processors, wherein the iterative optimization technique comprises performing for all sub-clusters in the set of clustered grids:

identifying an candidate cluster from the set of clustered grids based on the traffic density, the distance, and the total score with the distance threshold and the traffic load threshold;

identifying at least one candidate grid from the candidate cluster based on the total score and removing all the other grids except for the identified candidate grid from the set of clustered grids based on a selection-removal process; and selecting an candidate location from the identified candidate grid, wherein the candidate location selected for all sub-clusters in the set of clustered grids to form the final set of candidate locations.

7. The system of claim 6, wherein the grid identification technique comprises:

identifying a plurality of high-density locations based on the traffic threshold;

identifying a plurality of candidate streets based on the plurality of high-density location and the location count threshold;

identifying a plurality of candidate locations based on the plurality of candidate streets and the traffic count location; and identifying a plurality of candidate grids based on the plurality of candidate location.

8. The system of claim 6, wherein the clustering technique is performed for each candidate grid from the plurality of candidate grids, comprises:

computing a distance score between the candidate grid and the first set of grids;

selecting a subset of first set of grids based on the distance threshold;

computing a cumulative sum based on a distance between the subset of first set of grids and plurality of candidate grids, wherein the cumulative sum represents a cumulative sum of the traffic density; and clustering the subset of first set of grids and the plurality of candidate grids to generate the set of clustered grids based on the cumulative sum of traffic density, the traffic load threshold, the distance threshold, wherein the set of clustered grids comprises at least one candidate grids.

9. The system of claim 6, the distance penalty is computed as:

$$Dist_{pen_j} = \frac{Max_{dist}}{Dist_{Thres}}$$

where, $Max_{dist}$=Maximum distance between the evaluated Charging station and the Filtered grids identified with it i $Dist_{thes}$=Maximum service distance that charging station should ideally serve $Dist_{pen_j}$=Distance penalty for $j^{th}$ eligible grid.

10. The system of claim 6, the traffic penalty is computed as:

$$Traffic_{pen_j} = \frac{Trafload_{thres} - Traffic_{load}}{Trafload_{thres}},$$

if $|Trafload_{thres} - Traffic_{load}| > Traffic_{tol} = 0$, otherwise where, $Traffic_{load} = \sum_i TD_i \; \forall \; i$ mapped to $j^{th}$ eligile grid $Traffic_{tol}$ = Tolerence band for total traffic to be served $Traffic_{pen_j}$ = Traffic penalty for $j^{th}$ eligible grid.

11. One or more non-transitory machine-readable information storage mediums comprising one or more instructions which when executed by one or more hardware processors cause:

receiving a plurality of inputs comprising a city map of a city, a traffic count location, a daily traffic count for the traffic count location, a traffic threshold, and a location count threshold, a distance threshold and a traffic load threshold;

dividing the city map into a first set of grids wherein the first set of grids are equal size grids covering the city;

identifying one or more of the first set of grids as a plurality of candidate grids based on a grid identification technique;

estimating a traffic density for each of the candidate grids based on the daily traffic count for the traffic count location;

clustering the first set of grids and the plurality of candidate grids to generate a set of clustered grids using a clustering technique based on a computed cumulative sum;

computing a total score, wherein the total score is a summation of a distance penalty and a traffic penalty, wherein, the distance penalty is computed based on the distance threshold and a maximum distance, wherein the maximum distance is computed between the first set of grids and the plurality of candidate grids, and the traffic penalty is computed based on the traffic density and the traffic load threshold in the first set of grids; and identifying a final set of locations from the set of clustered grids using the traffic density, the distance, the traffic load threshold, and the distance threshold, based on an iterative optimization technique, wherein the iterative optimization technique comprises performing for all sub-clusters in the set of clustered grids:

identifying a cluster from the set of clustered grids based on the traffic density, the distance, and the total score with the distance threshold and the traffic load threshold;

identifying at least one candidate grid from the identified cluster based on the total score and removing all the other grids except for the identified grid from the set of clustered grids based on a selection-removal process; and selecting a candidate location from the identified at least one candidate grid, wherein the candidate location is selected for all sub-clusters in the set of clustered grids to form the final set of candidate locations.

12. The one or more non-transitory machine-readable information storage mediums of claim 11, wherein the grid identification technique comprises:

identifying a plurality of high-density locations based on the traffic threshold;

identifying a plurality of candidate streets based on the plurality of high-density location and the location count threshold;

identifying a plurality of candidate locations based on the plurality of candidate streets and the traffic count location; and identifying a plurality of candidate grids based on the plurality of candidate location.

13. The one or more non-transitory machine-readable information storage mediums of claim 11, wherein the clustering technique performed for each candidate grid from the plurality of candidate grids comprises:

computing a distance score between the candidate grid and the first set of grids;

selecting a subset of first set of grids based on the distance threshold;

computing a cumulative sum based on a distance between the subset of first set of grids and plurality of candidate grids, wherein the cumulative sum represents a cumulative sum of the traffic density; and clustering the subset of first set of grids and the plurality of candidate grids to generate the set of clustered grids based on the cumulative sum of traffic density, the traffic load threshold, the distance threshold, wherein the set of clustered grids comprises at least one candidate grids.

14. The one or more non-transitory machine-readable information storage mediums of claim 11, wherein computation of the distance penalty is expressed as:

$$Dist_{pen_j} = \frac{\text{Max}_{dist}}{Dist_{Thres}}$$

where, $\text{Max}_{dist}$=Maximum distance between the evaluated Charging station and the Filtered grids identified with it i, $Dist_{thes}$=Maximum service distance that charging station should ideally serve, and $Dist_{pen_i}$=Distance penalty for $j^{th}$ eligible grid.

15. The one or more non-transitory machine-readable information storage mediums of claim 11, wherein computation of the traffic penalty is expressed as:

$$\text{Traffic}_{pen_j} = \frac{Trafload_{thres} - \text{Traffic}_{load}}{Trafload_{thres}},$$

$$\text{if } |Trafload_{thres} - \text{Traffic}_{load}| > \text{Traffic}_{tol} = 0,$$

$$\text{otherwise where,}$$

$$\text{Traffic}_{load} = \sum_i TD_i \; \forall \, i \text{ mapped to } j^{th} \text{ eligile grid}$$

$$\text{Traffic}_{tol} = \text{Tolerence band for total traffic to be served}$$

$$\text{Traffic}_{pen_j} = \text{Traffic penalty for } j^{th} \text{ eligible grid.}$$

\*   \*   \*   \*   \*